United States Patent
Toth (10) Patent No.: US 10,179,517 B2
(45) Date of Patent: Jan. 15, 2019

(54) MODULE SYSTEM FOR A CHARGING APPARATUS, CHARGING APPARATUS AND VEHICLE INCLUDING A CHARGING APPARATUS CONSTRUCTED FROM THE MODULE SYSTEM

(71) Applicant: AUDI AG, Ingolstadt (DE)

(72) Inventor: Michael Toth, Neustadt/Donau (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/433,521

(22) PCT Filed: Sep. 21, 2013

(86) PCT No.: PCT/EP2013/002842
§ 371 (c)(1),
(2) Date: Apr. 3, 2015

(87) PCT Pub. No.: WO2014/053221
PCT Pub. Date: Apr. 10, 2014

(65) Prior Publication Data
US 2015/0224887 A1    Aug. 13, 2015

(30) Foreign Application Priority Data
Oct. 5, 2012   (DE) .......................... 10 2012 019 605

(51) Int. Cl.
*B60L 11/18*    (2006.01)
*H01R 13/514*   (2006.01)
(Continued)

(52) U.S. Cl.
CPC ....... *B60L 11/1818* (2013.01); *B60L 11/1846* (2013.01); *H01R 13/514* (2013.01);
(Continued)

(58) Field of Classification Search
CPC ............................ B60L 11/1818; B60L 11/18
(Continued)

(56) References Cited

U.S. PATENT DOCUMENTS 5,404,729 A    4/1995   Matsuoka et al.
5,417,579 A *  5/1995   Yoshioka ............ B60L 11/1818
                                              439/310
(Continued)

FOREIGN PATENT DOCUMENTS

CN    101348103    1/2009
CN    202455130    9/2012
(Continued)

OTHER PUBLICATIONS

Chinese Search Report dated Jul. 5, 2016 with respect to counterpart Chinese patent application 201380052039.1.
(Continued)

*Primary Examiner* — Nathaniel Pelton
*Assistant Examiner* — Dung V Bui
(74) *Attorney, Agent, or Firm* — Henry M. Feiereisen LLC (57) ABSTRACT

A module system is configured for establishing a plurality of variants of a charging device of a vehicle and includes a first module type with a first interface and a second interface; multiple variants of a second module type, each having a first interface and a second interface, wherein the variants have different second interfaces; multiple variants of a third module type, each having a first interface and a second interface, wherein the variants have different second interfaces; wherein the first interface of the second module type is configured for coupling with the first interface of the first module type, wherein the first interface of the third module type is configured for coupling with the second interface of the first module type, and wherein the charging socket can
(Continued)

be constructed from a coupling of a variant of the second module type, the first module type, and a variant of the third module type.

11 Claims, 6 Drawing Sheets

(51) Int. Cl.
  *H01R 13/74* (2006.01)
  *H01R 31/06* (2006.01)
(52) U.S. Cl.
  CPC .......... *H01R 13/74* (2013.01); *B60L 2240/36* (2013.01); *B60L 2240/547* (2013.01); *B60L 2240/549* (2013.01); *B60L 2250/16* (2013.01); *B60L 2270/32* (2013.01); *B60L 2270/34* (2013.01); *H01R 31/065* (2013.01); *H01R 2201/26* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)
(58) Field of Classification Search
  USPC .......................................................... 320/109
  See application file for complete search history.

(56) References Cited

U.S. PATENT DOCUMENTS

| | | | |
|---|---|---|---|
| 5,626,479 | A | 6/1997 | Hughes |
| 5,669,226 | A | 9/1997 | Kurshashi et al. |
| 6,220,880 | B1 | 4/2001 | Lee et al. |
| 6,834,511 | B2 | 12/2004 | Hatakeyama |
| 7,878,866 | B1* | 2/2011 | Kwasny ............... B60L 11/1818 439/474 |
| 2010/0026238 | A1* | 2/2010 | Suzuki ................. B60Q 1/2661 320/109 |
| 2010/0227505 | A1* | 9/2010 | Markyvech ............ B60L 11/14 439/620.29 |
| 2010/0302781 | A1* | 12/2010 | Markyvech ........... B60L 3/0069 362/253 |
| 2011/0294328 | A1 | 1/2011 | Katagiri |
| 2011/0055037 | A1* | 3/2011 | Hayashigawa ....... B60L 3/0069 705/26.1 |
| 2011/0151693 | A1* | 6/2011 | Loo ...................... B60L 11/1818 439/135 |
| 2011/0169447 | A1* | 7/2011 | Brown .................. B60L 3/0069 320/109 |
| 2011/0276194 | A1* | 11/2011 | Emalfarb ............ B60L 11/1838 700/297 |
| 2011/0300733 | A1* | 12/2011 | Janarthanam ....... B60L 11/1818 439/304 |
| 2012/0129378 | A1* | 5/2012 | Kiko .................... H01R 13/717 439/345 |
| 2012/0231644 | A1* | 9/2012 | Kinoshita ............. H01R 13/111 439/205 |
| 2012/0322302 | A1 | 12/2012 | Mori |
| 2013/0102162 | A1* | 4/2013 | Holmes .............. H01R 13/5213 439/34 |
| 2013/0314034 | A1 | 11/2013 | Ang |

FOREIGN PATENT DOCUMENTS

| | | |
|---|---|---|
| DE | 42 44 137 | 7/1993 |
| DE | 29711556 | 3/1998 |
| DE | 100 47 710 | 6/2002 |
| DE | 697 20 727 | 11/2003 |
| DE | 603 03 056 | 7/2006 |
| DE | 202011050412 | 6/2011 |
| DE | 102010045131 | 3/2012 |
| DE | 102011006633 | 3/2012 |
| DE | 102011004834 | 8/2012 |
| EP | 2 073 323 | 6/2009 |
| WO | WO 03/010859 | 2/2003 |
| WO | WO 2010/034741 | 4/2010 |
| WO | WO2012/086430 | 6/2011 |
| WO | WO 2011/098116 | 8/2011 |
| WO | WO2012/111081 | 8/2012 |

OTHER PUBLICATIONS

Translation of Chinese Search Report dated Jul. 5, 2016 with respect to counterpart Chinese patent application 201380052039.1.

* cited by examiner

MODULE SYSTEM FOR A CHARGING APPARATUS, CHARGING APPARATUS AND VEHICLE INCLUDING A CHARGING APPARATUS CONSTRUCTED FROM THE MODULE SYSTEM

CROSS-REFERENCES TO RELATED APPLICATIONS

This application is the U.S. National Stage of International Application No. PCT/EP2013/002842, filed Sep. 21, 2013, which designated the United States and has been published as International Publication No. WO 2014/053221 A1 and which claims the priority of German Patent Application, Serial No. 10 2012 019 605.9, filed Oct. 5, 2012, pursuant to 35 U.S.C. 119(a)-(d).

BACKGROUND OF THE INVENTION

The invention relates to a module system for a charging device which has a charging socket for charging an electric storage device of a vehicle, wherein the charging socket has a female connector for receiving a male charging connector and a has a fastening flange for fastening the charging socket on the vehicle. The invention also relates to a charging device made from the module system. The invention also relates to a vehicle with such a charging device. The vehicle is for example an at least partially electrically driven passenger car. The electric storage device is for example an accumulator for an electric drive.

It is known from the state-of-the-art to provide a charging socket in motor vehicles with electric drive, via which charging socket a battery of the motor vehicle can be charged by coupling a male charging connector at a charging station with the charging socket. The known charging sockets can be provided in a body of the motor vehicle similar to the tank filling socket of motor vehicles that are driven with internal combustion engines. On one hand charging sockets have to be well accessible to enable manual charging, on the other hand a most practical integration in a vehicle body and in that regard for example also a sealing is required.

The German published patent application DE 10 2011 006 633 A1 discloses a charging socket for a vehicle which is provided in a recess in addition to the conventional tank filling socket. A male charging connector can be coupled to the electric circuit of the vehicle via a female charging connector arranged inside the charging socket.

The German utility patent DE 20 2011 050 412 U1 discloses a connection module arranged in a tank recess, which connection module as a charging connection with a charging socket or a filling socket. The tank recess can be inserted into an opening of a fixed vehicle body part.

DE 10 2011 004 834 A1 discloses a charging device for an electric vehicle which is composed of structural components. Important is a structural component with an adapter plate, which can receive a further component with standardized and electrical plug-in connectors arranged in a standardized manner.

DE 297 11 556 U1 discloses a current supply for a motorbike. There, an installation socket is provided with an attachable sleeve on its backside, which protects electrical contacts against splash water.

In known charging sockets it is required to adapt the interfaces between the vehicle body and the charging socket and between the charging socket and the male charging connector to each other. This has several reasons. In different countries, for example on the Asian continent as compared to Europe, different plug geometries are established and for each of these geometries an appropriate molding or sealing or generally a plug-in connection has to be provided. Also integration into a particular type of vehicle body is not always possible or appropriate in the same way, because the installation recess formed by a vehicle body for mounting a charging socket cannot have the same geometry in all types of vehicle bodies. However, a different interface requires a considerable number of further changes to components adjacent the charging socket, for example with regard to sealings, fastening points on the vehicle body or construction space around the charging socket. This large variety requires many different components which all have to be tested and/or approved.

SUMMARY OF THE INVENTION

An object of the present invention is therefore to provide a device of the aforementioned type, with which a charging socket can be integrated into a vehicle body in a simpler way even when different boundary conditions, in particular mounting situations or male connector geometries are present.

This object is solved by a module system, a charging device and a vehicle with the features of the independent claims, Advantageous embodiments with useful refinements of the invention are set forth in the dependent patent claims.

The module system according to the invention is configured for establishing a multitude of variants of the charging device and includes:
a first module type with a first interface and a second interface;
multiple variants of a second module type, each having a first interface and a second interface, wherein the variants have different second interfaces;
multiple variants of a third module type, each having a first interface and a second interface, wherein the variants have different second interfaces;
wherein the first interface of the second module type is configured for coupling with the first interface of the first module type;
wherein the first interface of the third module type is configured for coupling with the second interface of the first module type;
and wherein the charging socket can be constructed from a coupling of a variant of the second module type, the first module type, and a variant of the third module type.

In other words one of the modules can be configured independent of the mounting situation as standard module. This provides a great degree of flexibility for the other modules and a defined interface. The module of the first module type can for example also have the fastening flange. This makes it possible that the charging socket can always be fastened on the vehicle body in the same manner and in the same position of the standard module relative to the vehicle body. This facilitates for example the sealing of the charging socket or also the electric connection of the charging socket with further lines within the vehicle. The modules can form the defined interface for example by a front-side flange which is configured in each module type with uniform dimensions, and via which preferably the one module is centered relative to the other module for example via a circumferential slant or a circumferential step, be it for an outer or inner centering. As a result of the fastening of the charging socket on the vehicle by means of the fastening flange on the standard module, the position of further modules is defined, in particular relative to the vehicle body or cable branch-offs to the interior of the vehicle, and the further modules can be configured according to customer specifications if required. The term multitude of modules is already satisfied when two modules are present, however it preferably includes three modules but also more than three modules.

The charging socket is formed by those modules that perform an electrical function directly in connection with a charging process of the vehicle, i.e., by those modules through which the charging current flows.

Preferably, the standard module, i.e., the module of the first module type, is provided between two further modules with which it is connected via screw points or clip geometries. The two further modules do not have to be standardized and can be adjusted to specific mounting situations. Only the interface to the standard module has to be adapted to the standard module. The main connection between the vehicle and the charging socket can be ensured independent thereof by the standard module.

As a result of the standardization of one of multiple modules, a charging socket can be designed and manufactured by multiple manufacturers in a simple manner independent of the vehicle type. Each manufacturer can also offer variants for its module, which each have the appropriate interface to the standardized module. A module that is independent of the mounting situation is understood to be a module which can be used in a standardized manner independent of the vehicle type and a vehicle body shape, in particular by coupling to the vehicle body via the fastening flange provided on the standard module.

In an advantageous embodiment of the invention the charging socket is formed by three modules serially arranged adjacent each other, i.e., arranged in a row. Hereby one of the modules can be provided outside relative to the outer surface of the vehicle body as outwardly oriented module, and a further one of the modules can be provided inside as inwardly oriented module, wherein the outwardly oriented module and the inwardly oriented module are of the second and third module type. Preferably the interfaces via which the modules can be coupled with each other, are arranged on front sides of the modules. They can be configured as latching connections or bayonet connections.

The middle module, i.e., the module of the first module type, only has to be provided in a single configuration for a multitude of vehicle types. This reduces the number of different components, which also allows reducing the number of tools and the costs for quality assurance and approval. The middle module only has to be tested once. The outwardly oriented module is preferably provided by a customer as customer module. The customer can provide the customer module with a fitting interface while still being able to offer multiple variants. The inwardly oriented module is preferably provided as power module.

The outwardly oriented module can have a function for connecting a soft component, and can be provided with a specific design lid, a specific design molding and/or an LED. The design lid can for example be configured for pivoting, inserting or rotating. A soft component can for example take over the function of a radial sealing and can be provided in the manner of a tourniquet around lines or exposed surfaces.

The inwardly oriented module can for example have a bushing, contacts as connections to a line and a line fastening or line arrangement.

In an advantageous embodiment of the invention, a charging socket holder is provided on the charging device for mounting the charging socket on the vehicle body, and the first module type is configured as a core module, which is configured for an electrical and/or electronic function of the charging device and which is coupled with the charging socket holder, in particular by the fastening flange. The charging socket holder can in many cases facilitate the mounting of the charging socket on the vehicle body. Also a charging socket holder can provide a mechanical reinforcement and/or a positional offset. As a result of the coupling of the middle module with the charging socket holder a high variability of the outer and inner module can be maintained without having to provide further interfaces. The charging socket holder can have a centering on its interface and/or on the interface to the middle flange, and optionally a centering of the middle module relative to the charging socket holder can occur via the fastening flange. Configuring the middle module as a core module with a multitude of functions has the advantage that the most important module is always present in the same configuration. It has been shown that advantages such as a greater functional reliability, better robustness or easier maintenance or repair result, in particular due to the standardized and optimizable connection to the vehicle body, when the middle module, and not the inside located module, is configured as core module.

An electrical function can include providing the appropriate electrical contact regarding current strength and voltage and/or providing a fuse and/or a temperature sensor in connection with a monitoring of the electrical function. A temperature that for example rises above a defined value can indicate a malfunction, and a temperature within the range of defined threshold values can signal that a charging process is being performed properly. An electronic function can be realized by a measurement of for example temperature, current or voltage in connection with a control circuit or regulation circuit. An electronic function can for example be realized by a locking actuator. By integrating as many functions as possible in a central standard module, the functional reliability of the charging socket can be improved, in particular in that the same components can be used and the same protective functions can be used. In addition this also facilitates repair and maintenance.

In spite of the integration of multiple functions, the core module can be configured as a central constant core part. On the core module variance components, in particular further modules, can be fastened, for example by means of screw points or clip-geometries in order to meet the requirements of specific mounting situations. Via the core module mechanical forces, which may act during a charging process on the charging socket, can be transmitted to the vehicle body via the charging socket holder in a defined manner, in particular distributed over a defined surface. The charging socket holder can for example first be fastened on the fastening flange of the charging socket to then mount the charging socket holder on the vehicle body or the charging socket holder can already be provided on the vehicle body and the charging socket is directly connected to the vehicle body or the charging socket holder via the fastening flange. In both cases the charging socket holder can be configured as a mounting-situation independent standard component, which is connectable with the charging socket in a uniform manner, in particular with the fastening flange, so that independent of a preferred mounting variant the charging socket holder and the fastening flange together ensure a uniform, standardizable interface to the vehicle, in particular to the vehicle body.

In an advantageous embodiment of the invention, the fastening flange is configured uniform for all variants, in particular in that a defined arrangement of fastening points, preferably screw points in a hole geometry, are provided. In other words the fastening flange can be configured mounting-situation independent as standard fastening flange. A hole geometry preferably means a multitude of through-bores, optionally with internal threading, arranged in a circle or multiple concentrically arranged circles. Optionally also welding points, clip points and/or latching points can be provided for example arranged in a circle at regular distances to each other. This allows ensuring that a manufacturer of a vehicle body can provide the vehicle body with regard to a standardized flange and that the charging socket can always be fastened on a vehicle body in the same manner. Thus for example the charging socket can be fastened in the same manner even in the case of varying mounting recesses. In the case of a standardized hole geometry the manufacturer of the vehicle body can for example provide threaded bores on the vehicle body at corresponding sites. A standardization of one of the modules in connection with a standardized fastening flange on one hand offers the advantage of a simplified production of the entire charging device, also in the case of different manufacturers for each of the modules, on the other hand it also offers the advantage of a standardized mounting and thereby also a predetermined position of the not standardized modules relative to the vehicle body.

In an advantageous embodiment of the invention the module of the first type is coupled with the charging socket holder, and the charging outlet holder is configured uniform for all variants of the charging device, in particular in that a defined arrangement of fastening points, preferably screw points in a hole geometry, is provided. In other words the charging socket holder can be configured mounting-situation independent as standard charging socket holder. Optionally also welding points, clip points and/or latching points can be provided. A standardized charging socket holder enables a standardized mounting of the charging socket. The charging socket holder can be configured with regard to coupling to the fastening flange and at the same time take over a compensation function in radial and/or axial direction if required in certain mounting recesses. According to a variant, the charging socket holder can also be connectable with a vehicle body at variable connection points, in particular by providing for example oblong holes or multiple through-bores introduced along multiple circles arranged concentric relative to each other. This also increases the flexibility in a standardized charging socket holder, which may be required in case of a particularly high number of different forms of vehicle bodies. Thus any type of charging socket can be connected with a vehicle body via the fastening flange and the standardized charging socket holder, in particular also independent of any male connector geometry. A standardization of one of the modules in connection with a standardized charging socket holder, as in the case of a standardized fastening flange, on one hand has the advantage of a simplified production for each of the modules, on the other hand the advantage of a standardized mounting and consequently of a predetermined position of the not standardized modules relative to the vehicle body.

Preferably the charging socket holder can be screwed or welded to the vehicle body, i.e., it is screwed or welded on the vehicle body in a mounted state of the charging device. For this the charging socket holder itself can have a flange comparable to the fastening flange. However, welding flanges or any defined step of much simpler construction can be provided to cost-effectively connect the charging socket holder in a materially bonding manner on a few points with the vehicle body. The charging socket holder thus also allows using an irreversible connection to provide a standardized interface on a vehicle body without a vehicle body manufacturer having to address this issue. The charging socket holder can thus serve as an adapter. In case of a screw connection it can be useful when a vehicle body manufacturer already provides corresponding bores on the vehicle body.

Preferably the charging socket holder is screwed together with the fastening flange. A screw connection establishes in a simple manner a very durable reversible connection and can also provide the required force to achieve a sealing of the charging socket relative to the vehicle body. Also an adapter can be provided by a charging socket holder which can itself for example be welded to the vehicle body, which adapter removes the requirement to configure the vehicle body strictly with regard to a standardized fastening flange or which renders the choice of the type of fastening to the vehicle body more flexible, i.e., it is not limited to a screw connection that may be particularly preferred in the case of the fastening flange.

In an advantageous embodiment of the invention, a charging flap module for closing a mounting recess of a vehicle body is provided on the charging device and the charging socket on the module of the first module type is configured with a outer geometry that is standardized for all variants of the charging device, and the charging flap module has an interface standardized for all variants of the charging device, via which interface the charging flap module can be coupled with the charging socket via the outer geometry independent of the shape of the male charging connector. In other words a standard outer geometry, which is independent from a mounting situation, can be provided in connection with a mounting-situation independent interface. Hereby in connection with a mounting-situation independent outer geometry of male charging connectors the same charging flap module can always be used independent of the charging socket, and it can be ensured that for different male charging connectors, for example in Asia and in Europe, the same charging flap module can be used. Preferably the standard outer geometry is present on an inner or outer surface of the standard module, in particular on an inner or outer sheath surface. The standard outer geometry can for example be a cylindrical surface or a conical surface. The de-coupling of the interface from the male connector geometry also has the advantage that also when the same male charging connector cannot always be used, the construction of the charging device and its connection to the vehicle can be configured identical.

The charging flap module is preferably understood as a module of the charging device and not as a module of the charging socket itself, in particular because the charging flap module is to be assigned in its function to the vehicle body rather than to the charging socket, which is provided with electronic functions. The charging flap module only needs to be configured with one interface corresponding to the standard outer geometry. The charging flap module can be understood as a type of closing body which for example allows avoiding that good aerodynamic properties of the vehicle body are negatively affected by a mounting recess. The charging flap module can hereby also serve for closing recesses or hollow spaces between the vehicle body and the charging socket. The charging flap module can for example be coupled to one of the further modules, preferably to the standard module also for the case that it is provided in addition to three modules arranged in line.

In a variant the middle module has on the side of the outwardly oriented module a base body, which has the mounting-situation independent standard outer geometry by which the charging device can be coupled with the vehicle body independent of the shape or outer geometry of the male charging connector. As a result of the de-coupling of the standardized outer geometry from the fastening flange, the fastening flange alone can be configured with regard to the coupling to the vehicle body or the charging socket holder and the different shapes of male charging connectors do not have to be taken into account with regard to the fastening flange. Further the basic body enables providing the standard outer geometry in an advantageous position far in the direction of the outwardly oriented side of the charging socket, which allows configuring the charging flap module simpler, and in particular also flatter. As a result fewer boundary conditions have to be taken into account for the production of the charging flap module as in the case that the standard outer geometry is provided on a further inwardly located fastening flange.

Preferably the middle module is configured for a mechanical function of the charging device. A mechanical function is preferably understood as any function that is not an electrical or electronic function. Preferably the middle module has therefore multiple of the following components: a water drain, a sealing, a two-stage clip-geometry for a soft component or a space reserve on the side of the outwardly oriented module, wherein the space reserve ensures a greater variability for the provider of the outer module. The water drain can also be a part of a water management through which water entering the mounting recess or coming into contact with the charging socket can be drained. A locking actuator can be provided for the locking or release of a male charging connector for example in digital form. By integrating as many of these components into the middle module as possible the functional reliability of the charging socket can be improved and the costs of the entire charging device can be lowered because more components can be provided in higher numbers. Also repairs and maintenance can thereby be made easier.

As mentioned, the aforementioned object is also solved by a charging device with the features of patent claim 7.

As mentioned the aforementioned object is also solved by a motor vehicle with the features of patent claim 8, i.e., a vehicle with a charging socket made of the module system according to the invention as part of the charging device and with an accumulator for an electric drive of the vehicle, wherein the charging device is constructed from at least three modules arranged serially adjacent each other, i.e., in a row, and the middle module which is arranged between other modules is of the first module type which is arranged on the vehicle such that the other modules of the second and third module type can be coupled with the module of the first module type after mounting of the module of the first module type. This enables a vehicle manufacturer to provide the vehicle with an already pre-mounted charging socket component and to mount the other modules afterwards. This provides a greater flexibility during production. Preferably the standard module is arranged in a plane defined by a walling of vehicle body, which is oriented such that the outer interface of the standard module is accessible from the mounting recess and the inner interface of the standard module is accessible from the vehicle body inside. This enables using plug-in connections such as latching noses, clips or the like for a simple mounting.

The features and feature combinations mentioned in the description above and the features or feature combinations mentioned in the following in the figure description or the features and feature combinations shown by themselves in the figures may not only be used in the respectively described combination but also in other combinations or by themselves without departing from the scope of the invention.

Further advantages features and details of the invention become apparent from the claims, the following description of preferred embodiments and by way of he drawing wherein identical reference signs are used for the same of functionally equivalent elements. It is shown in:

Figure 1:
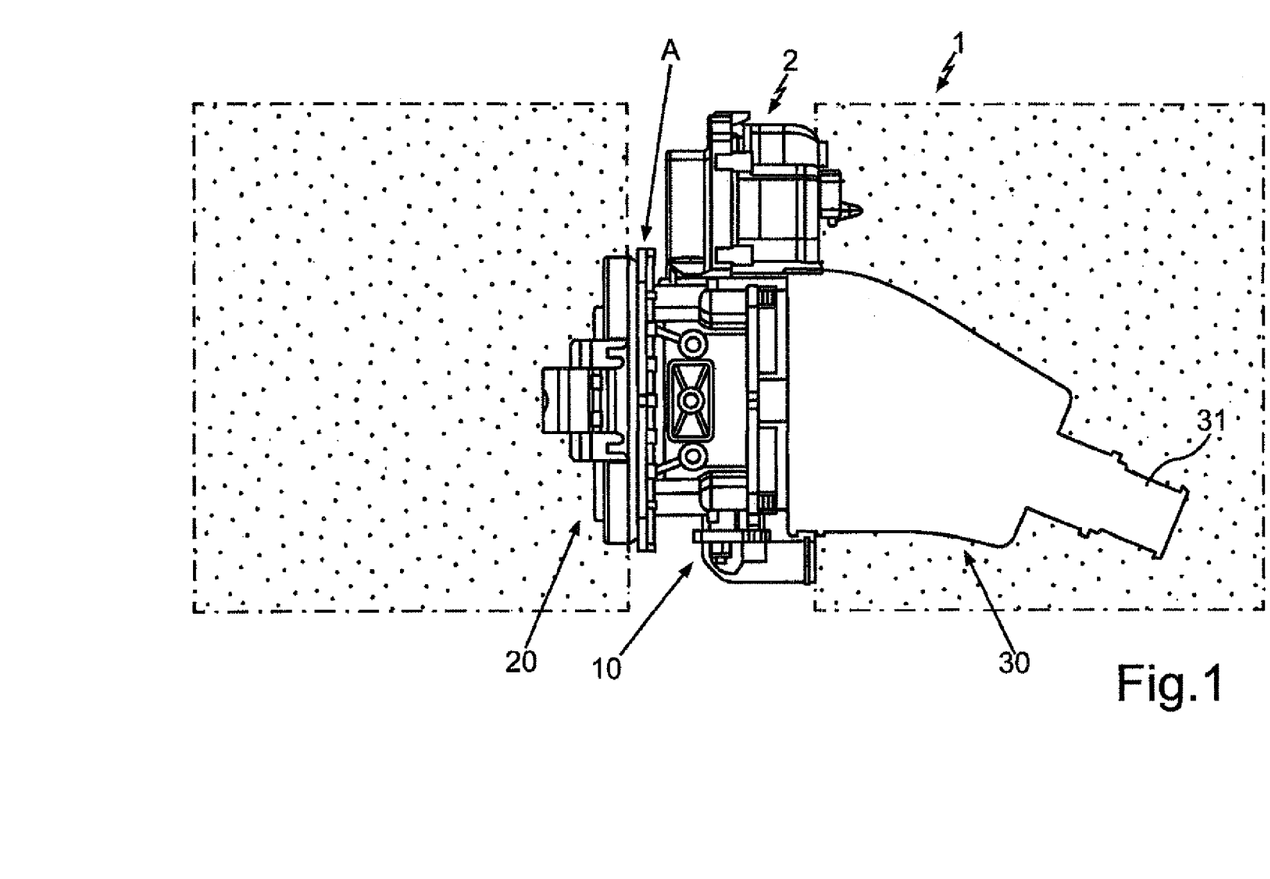
FIG. 1 a side view of a charging device made from a module system according to an exemplary embodiment of the invention.

FIG. 1 shows a charging device 1 with a charging socket 2, which is formed by three modules 10, 20, 30, i.e., a module 20 which in a mounted state on a vehicle body is oriented outwardly toward the outside of the vehicle body, a middle module 10, and an inwardly oriented module 30. The middle module 10 has on the side facing the outwardly oriented module 20 a standardized outer geometry A, for example in the form of a circular outer sheath surface, via which the charging socket 2 can be integrated in a vehicle body and sealed. The three modules 10, 20, 30 can be provided independent of each other from different manufacturers. On the charging socket 2, preferably on the middle module 10, a fastening flange (not shown) is provided via which the charging socket 2 can be connected with a charging socket holder (not shown). The charging socket holder is coupled to a vehicle body and ensures the fastening and orientation of the charging socket 2 relative to the vehicle body.

The middle module 10 can be configured as a core module into which for example contacts and/or a water management and water drainage and/or sealings for line branch-offs and/or a locking actuator and/or a temperature sensor are integrated. This results in a great variability while at the same time providing a standardized and cost-effective integration of the charging socket 2 in a vehicle body. The middle module 10 can further have a socket basic body and a two-stage clip geometry for a soft component and a space reserve for certain optional components such as a design molding.

The outwardly oriented module 20 is configured as a module which enables a high variance for an automobile manufacturer, for example with regard to a connection to a soft component, a design lid or the mechanism in a design lid, for example pivoting, inserting or rotating, a design molding or an illumination for example by means of LED.

The inwardly oriented module 30 is configured as a module which predominantly serves the function of a line branch-off, i.e., a bushing 31 and/or contacts as connections to the line and/or a line fastening or multiple line arrangements can be provided therein.

The modular construction is illustrated by the two shaded surfaces which are framed by dotted-dashed lines: on the middle module 10 the two other modules are coupled on both sides via interfaces, however each module is by itself an independent assembly, which can be respectively optionally produced and provided by a specific manufacturer. A manufacturer of the outward—or inward situated module thus does not have to take the mounting situation in a certain vehicle into account.

Figure 2A:
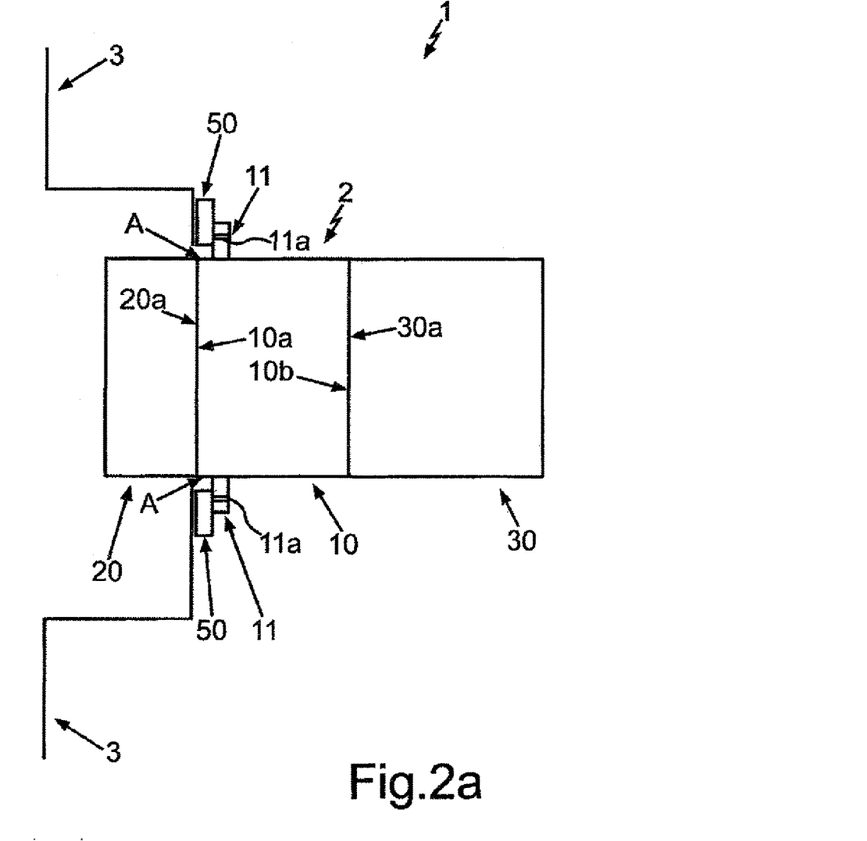
FIG. 2a a schematic sectional view of an embodiment for a connection of a charging device made from a module system according to the invention to a vehicle body.

FIG. 2a shows a charging device 1 with a charging socket 2 made from the already described modules 10, 20, 30, wherein on the middle module 10 a fastening flange 11 is provided which is connected with a charging socket holder 50 which is coupled to a vehicle body 3 of a vehicle (Not shown). The fastening flange 11 has through-passages 11a which are for example configured as screw-on holes and via which the middle module 10 and with this the entire charging socket 2 can be connected, in particular screwed, with the charging socket holder 50. The fastening flange 11 can be provided as an independent component as suggested in FIG. 2a, however it can also be connected one-piece with a component of the middle module 10, for example one-piece in the form of a rib or loop protruding from a socket basic body.

The fastening flange 11 can be provided slightly spaced apart from the side bordering the outwardly oriented module 20 and can also be fully independent from the standardized outer geometry A. Optionally, the fastening flange 11 can however also partially form the outer geometry A. This can be advantageous for example when a sealing with regard to the vehicle body is to be accomplished via the outer geometry A and the sealing can also be achieved by a contact pressure. Then the contact pressure can be exerted via the fastening flange 11 and can be directly transmitted to a sealing means between the outer geometry A and the vehicle body.

The charging socket holder 50 can be connected with the vehicle body 3 such that the fastening flange 11 can be connected from inside or also radially with the charging outlet holder 50. Preferably the charging socket holder 50 is connected with the vehicle body 3 such that the fastening flange 11 can be connected with the charging socket holder 50 from the inside so that screw connections or other connection means do not expose an additional sealed region but rather a sealing can be accomplished independent of the type of the connection. The charging socket holder 50 is preferably welded or screwed to the vehicle body 3.

The three modules 10, 20, 30 are arranged in a row and are respectively coupled with each other via an interface 10a, 10b, 20a, 30a, i.e., via their end faces which are arranged at least approximately perpendicular to a direction in which electric connections between the modules extend.

In this way the modules 10, 20, 30 can be coupled to each other in a simple manner, in particular also independent of a mounting step of the middle module 10 on the vehicle body 3, because the outer module 20 and the inner module 30 can for example also be coupled to the middle module 10 after the mounting of the middle module 10.

Figure 2B:
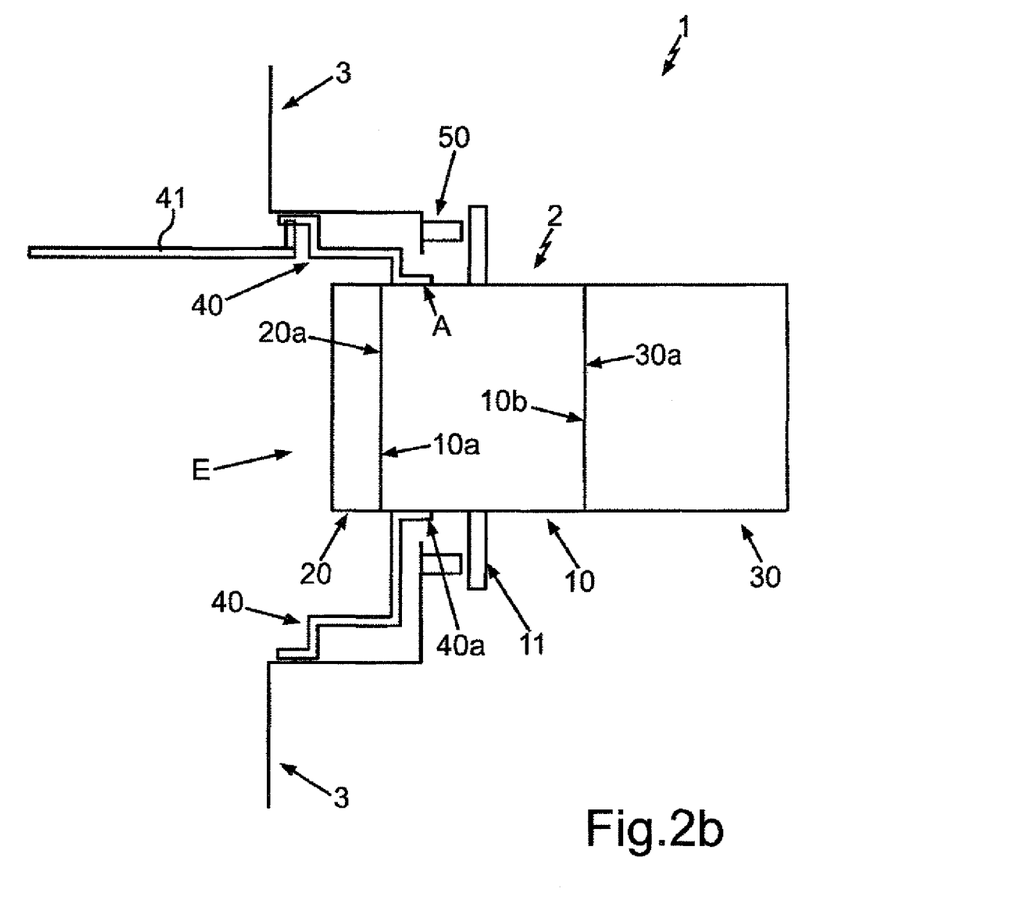
FIG. 2b a schematic sectional view of an embodiment for a connection of a charging device made from a module system according to an exemplary embodiment of the invention to a vehicle body, wherein a charging flap module is provided.

FIG. 2b illustrates the manner in which a charging socket 2 provided in a mounting recess E can be coupled with a charging flap module 40 so that a coupling between the charging socket 2 and the charging flap module 40 is independent of a specific male charging connector geometry as explained in more detail in connection with FIGS. 3c and 3d. The charging flap module 40 is coupled with the vehicle body 3 and serves, hereby also for covering the mounting recess E, for which it has a charging flap 41. On the charging flap module 40 a standardized interface 40a is provided via which the charging flap module 40 can be coupled with the charging socket 2, in particular with the outwardly oriented module 20 or as shown with the middle module 10 for which a standardized outer geometry A is provided. The positions and arrangements indicated in FIG. 2b of the individual modules are schematized. Shown distances between modules or flanges are not strictly required. FIG. 2b is a principle illustration of the male charging connector-independent coupling between a standardized interface 40a of the charging flap module 40 and one of the modules 10, 20, 30.

Figure 3A:
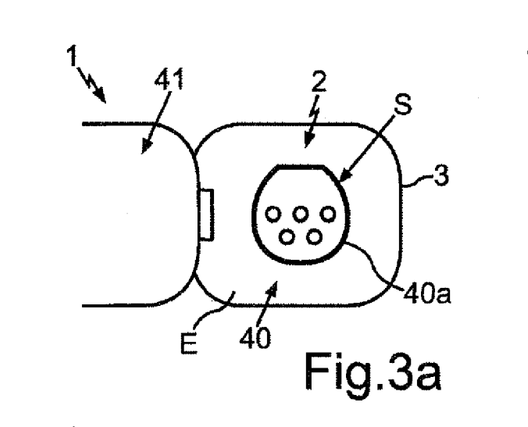
FIG. 3a a schematic view of a recess of a vehicle body in which a charging socket according the state of the art is arranged.

FIG. 3a shows a view from outside onto a charging socket 2 with a geometry as it is often used in Europe. A part of a vehicle body 3 is formed as a mounting recess E into which the charging socket 2 is inserted. The mounting recess E can be covered by a charging flap 41, which is a component of a charging flap module 40. The charging flap module 40 is coupled at an interface 40a with the charging socket 2, in that the interface 40a is configured in the form of a male charging connector, i.e., has a geometry corresponding to a male charging connector geometry S.

Figure 3B:
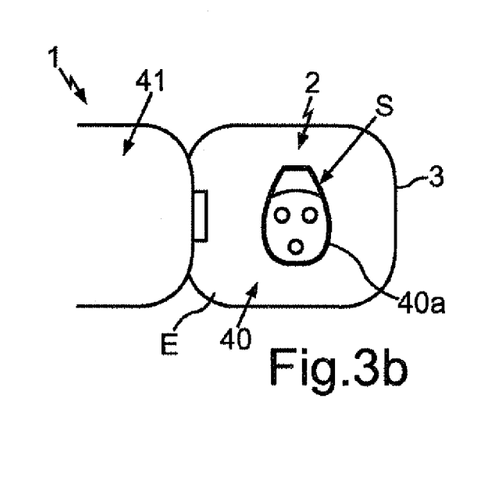
FIG. 3b a schematic view as in FIG. 3a, wherein the charging socket according to the state of the art is provided for another plug geometry.

FIG. 3b shows an interface 40a for a male charging connector with a male charging connector geometry S as it can often be found in Asia, for example Japan. The male charging connector geometry S of FIG. 3 deviates from the one of FIG. 3a and because the interfaces 40a are in both cases also adapted to the male charging connector geometry S, the interfaces 40a also deviate from each other. In other words the interface 40a in these charging flap modules 40 has to be respectively configured in accordance with the male charging connector geometry S.

Figure 3C:
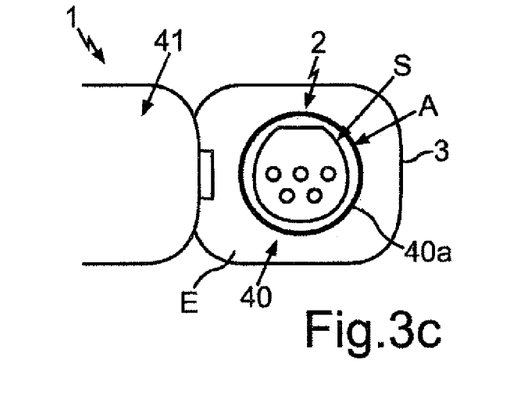
FIG. 3c a schematic view of a part of charging device made from a module system according to an exemplary embodiment of the invention, which part is arranged in the region the body of a vehicle and has a specific outer geometry.
Figure 3D:
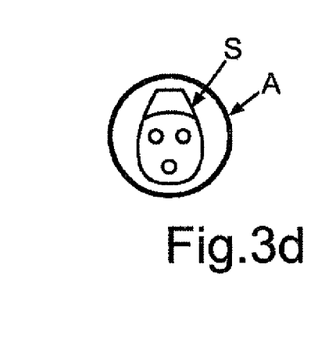
FIG. 3d a schematic view as in FIG. 3c, wherein the charging device is provided for another plug geometry.

FIG. 3c shows that with a charging socket 2 with a standardized outer geometry A the same charging flap module 40 can be used in all cases. The outer geometry A is preferably provided by the middle module of the charging socket 2, however it can also be provided by the outwardly oriented module of the charging socket 2. The outer geometry A can for example be provided by a circular circumferential flange in which also a through-passage for a male charging connector is provided. This enables using a charging flap module 40 with constant (in particular circular) interface 40a independent of the male charging connector geometry. The charging flap module 40 is thus standardized and can be provided in a mounted state as a standard part of the charging device 1.

FIG. 3d again shows for the male charging connector with a male charging connector geometry S as it can often be found in Asia, for example in Japan, how a standardized charging flap module 40 can be used.

Figure 4A:
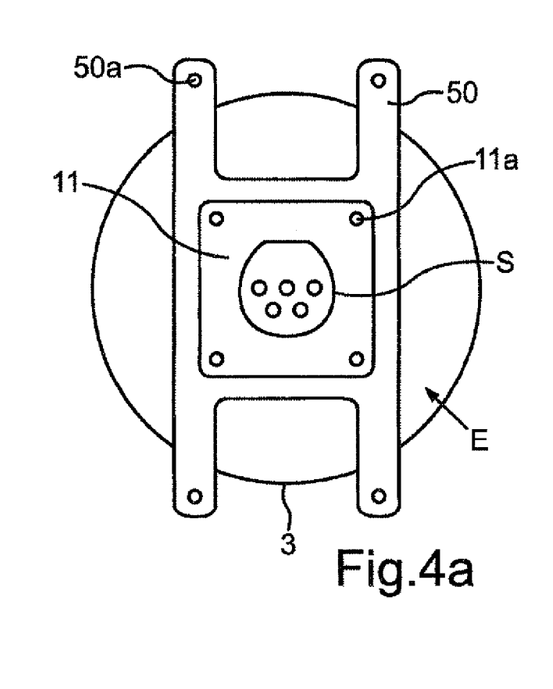
FIG. 4a a schematic view of a fastening flange and a charging socket holder for a charging device made from a module system according to an exemplary embodiment of the invention.

FIG. 4a shows a particular type of a fastening flange 1, which can be connected with a charging socket holder 50. Also the charging socket holder 50 has screw-on holes 50a via which it can be coupled to the vehicle body 3. FIG. 4a shows that the fastening flange 11 radially protrudes over the male charging connector geometry S, i.e., radially projects significantly further. This renders the connection between the fastening flange 11 and the charging socket holder 50 independent of the configuration of the male charging connector. Rather the connection can be accomplished in the same manner. The charging socket holder 50 protrudes over a section of the vehicle body 3 via which the mounting recess E is defined. This ensures that independent of the vehicle body shape the charging socket can in each case be coupled to the vehicle body 3 with the standardized charging socket holder 50.

Figure 4B:
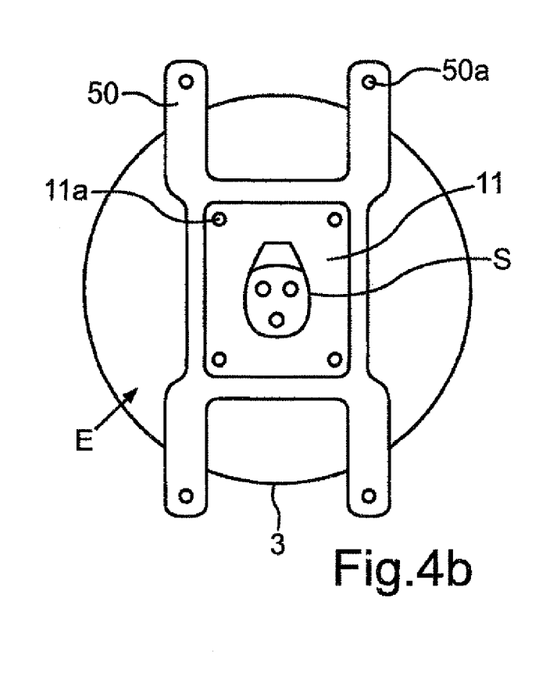
FIG. 4b a schematic view as in FIG. 4a wherein according to the state of the art a different charge outlet holder and a different fastening flange are provided.

FIG. 4b shows a variant of the charging socket holder 50 and the fastening flange 11. This variant is required according to the state of the art in order to enable a connection of the charging socket in the case of a deviating male charging connector geometry S. According to the present invention the fastening flange 11 on the other hand is configured so that it can be configured standardized independent of the type of the male charging connector, i.e., independent of the male charging connector geometry S, and also the charging socket holder 50 can be configured standardized independent of the male charging connector geometry S.

Figure 5:
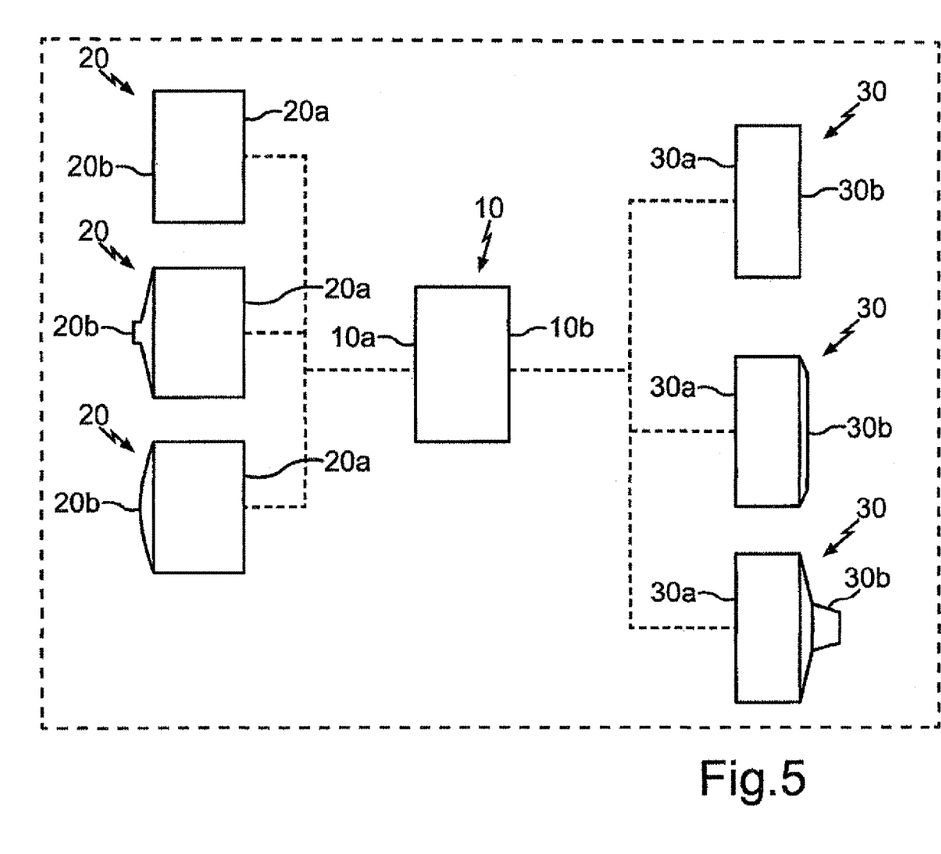
FIG. 5 a schematic diagram for illustrating an exemplary embodiment of a module system according to the invention.

FIG. 5 shows a module system in which a module of a first module type 10 is provided and six modules 20, 30 of a second and third module type. The module types differ in that in the first module type 10 two interfaces to other modules are configured as defined interfaces 10a, 10b, whereas in the second and third module type 20, 30 only one interface 20, 30a, i.e. the one to the module of the first module type 10, is configured as defined interface 20a, 30a, and the other interface 20b, 30b respectively deviates from the corresponding interface 20b, 30b of the further modules of the same module type 20, 30. This allows providing a great variety of variants, in the shown example nine differently constructed charging devices, which however can be coupled with each other and with a vehicle body in all cases in the same manner.

The invention claimed is:

1. A module system for constructing a charging socket of a charging device for charging an electrical storage device of a vehicle, wherein the charging socket has a female connector for receiving a male charging connector and a fastening flange for fastening the charging socket on the vehicle, said module system being configured for generating a plurality of variants of the charging device and comprises:
a first mounting-situation independent module type having a first interface and a second interface;
multiple variants of a second module type each having a first interface and a second interface, said variants having different second interfaces and matching first interfaces;
multiple variants of a third module type each having a first interface and a second interface, said variants having different second interfaces and matching first interfaces,
wherein the second module type is outwardly oriented and includes a design lid for pivoting, inserting or rotating, design molding and/or an LED, said design lid being arranged with a soft component, which soft component, radially sealing the design lid in the form of a tourniquet around lines or exposed surfaces,
wherein the third module type is inwardly oriented and includes a bushing, contacts as connections to a line and a line fastening or a line arrangement,
wherein the first interface of the second module type is configured for coupling with a first interface of a first module type,
wherein the first interface of the third module type is configured for coupling with a second interface of the first module type,
wherein the charging socket is constructible by coupling the one of the variants of the second module type, the first module type and the one of the variants of the third module type, so that, in a charging process, a charging current flows through each of the module types from which the charging socket is formed,
wherein the charging socket is constructible by a serial arrangement of the one of the variants of the second module type, the first module type and the one of the variants of the third module type.

2. The module system of claim 1, further comprising a charging socket holder on the charging device for mounting the charging socket on a body of the vehicle, said first module type being configured as a core module which is configured for an electric function of the charging device and is coupled with the charging socket holder.

3. The module system of claim 1, wherein the fastening flange is configured standardized for all of the plurality of variants of the charging device.

4. The module system of claim 3, wherein the fastening flange is configured standardized in that for all variants of the plurality of variants of the charging device fastening points are provided arranged in a single defined arrangement.

5. The module system of claim 4, wherein the fastening points are configured as through-bores arranged in a hole geometry.

6. The module system of claim 5, wherein the through-bores have respective internal threadings.

7. The module system of claim 2, wherein the charging socket holder is configured standardized for all of the plurality of variants of the charging device.

8. The module system of claim 2, wherein the charging socket holder is configured standardized in that fastening points preferably through bores, preferably with respective internal threadings, are provided arranged in a defined hole geometry.

9. The module system of claim 1, further comprising a charging flap module for closing a mounting recess of a vehicle body, wherein the charging socket is at least partially arrangeable in the mounting recess, wherein the charging socket on the first module type is configured with an outer geometry which is standardized for all variants of the charging device, and wherein the charging flap module has an interface which is standardized for all variants of the charging device, via which interface the charging flap module can be coupled with the charging socket via the outer geometry independent of a form of the male charging connector.

10. A charging device, comprising:
a charging socket made of a module system for constructing the charging socket of the charging device for charging an electrical storage device of a vehicle, wherein the charging socket has a female connector for receiving a male charging connector and a fastening flange for fastening the charging socket on the vehicle, said module system being configured for generating a plurality of variants of the charging device, said charging socket including,
a first mounting-situation independent module type having a first interface and a second interface;

multiple variants of a second module type each having a first interface and a second interface, said variants having different second interfaces and matching first interfaces;
multiple variants of a third module type each having a first interface and a second interface, said variants having different second interfaces and matching first interfaces,
wherein the second module type is outwardly oriented and includes a design lid for pivoting, inserting or rotating, design molding and/or an LED, said design lid being arranged with a soft component, which soft component, radially sealing the design lid in the form of a tourniquet around lines or exposed surfaces,
wherein the third module type is inwardly oriented and includes a bushing, contacts as connections to a line and a line fastening or a line arrangement,
wherein the first interface of the second module type is configured for coupling with a first interface of a first module type,
wherein the first interface of the third module type is configured for coupling with a second interface of the first module type,
wherein the charging socket is constructible by coupling the one of the variants of the second module type, the first module type and the one of the variants of the third module type, so that, in a charging process, a charging current flows through each of the module types from which the charging socket is formed,
wherein the charging socket is constructible by a serial arrangement of the one of the variants of the second module type, the first module type and the one of the variants of the third module type.

11. A vehicle, comprising:
a charging socket made from a module system for constructing the charging socket of a charging device for charging an electrical storage device of the vehicle, wherein the charging socket has a female connector for receiving a male charging connector and a fastening flange for fastening the charging socket on the vehicle, said module system being configured for generating a plurality of variants of the charging device, said charging socket including,
a first mounting-situation independent module type having a first interface and a second interface;
multiple variants of a second module type each having a first interface and a second interface, said variants having different second interfaces and matching first interfaces;
multiple variants of a third module type each having a first interface and a second interface, said variants having different second interfaces and matching first interfaces,
wherein the second module type is outwardly oriented and includes a design lid for pivoting, inserting or rotating, design molding and/or an LED, said design lid being arranged with a soft component, which soft component, radially sealing the design lid in the form of a tourniquet around lines or exposed surfaces,
wherein the third module type is inwardly oriented and includes a bushing, contacts as connections to a line and a line fastening or a line arrangement,
wherein the first interface of the second module type is configured for coupling with a first interface of a first module type,
wherein the first interface of the third module type is configured for coupling with a second interface of the first module type,
wherein the charging socket is constructible by coupling the one of the variants of the second module type, the first module type and the one of the variants of the third module type, so that, in a charging process, a charging current flows through each of the module types from which the charging socket is formed,
wherein the charging socket is constructible by a serial arrangement of the one of the variants of the second module type, the first module type and the one of the variants of the third module type; and
an accumulator for an electric drive of the vehicle, wherein the charging socket is made of a serial arrangement of at least the one of the variants of the second module type, the first module type and the one of the variants of the third module type, wherein the module of the first module type is arranged between the one of the variants of the second module type and the one of the variants of the third module type so that the one of the variants of the second module type and the one of the variants of the third module type are mountable after mounting of the module of the first module type and can be coupled to the module of the first module type after the mounting.

\* \* \* \* \*